United States Patent
Lee

(10) Patent No.: US 11,505,189 B2
(45) Date of Patent: Nov. 22, 2022

(54) VEHICLE SCC SYSTEM BASED ON COMPLEX INFORMATION AND METHOD OF CONTROLLING THE SAME

(71) Applicant: HYUNDAI MOBIS Co., Ltd., Seoul (KR)

(72) Inventor: Jung Gue Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 120 days.

(21) Appl. No.: 16/867,877

(22) Filed: May 6, 2020

(65) Prior Publication Data

US 2020/0353922 A1 Nov. 12, 2020

(30) Foreign Application Priority Data

May 7, 2019 (KR) .................. 10-2019-0053342

(51) Int. Cl.
*B60W 30/14* (2006.01)
*G01S 19/42* (2010.01)
*B60W 40/04* (2006.01)
*B60W 40/06* (2012.01)

(52) U.S. Cl.
CPC .......... *B60W 30/146* (2013.01); *B60W 40/04* (2013.01); *B60W 40/06* (2013.01); *G01S 19/42* (2013.01); *B60W 2420/42* (2013.01); *B60W 2420/52* (2013.01); *B60W 2555/60* (2020.02)

(58) Field of Classification Search
CPC ......... B60W 2420/42; B60W 2420/52; B60W 2552/53; B60W 2555/60; B60W 2556/50; B60W 2720/10; B60W 30/143; B60W 30/146; B60W 40/04; B60W 40/06; B60W 50/029; B60W 50/035; B60W 50/045; B60W 30/14; G01S 19/14; G01S 19/42; G01S 19/52

See application file for complete search history.

(56) References Cited

U.S. PATENT DOCUMENTS 10,460,182 B1 * 10/2019 Park .................. G05D 1/0257
10,569,770 B1 *  2/2020 You ................... B60W 30/09
11,014,559 B2 *  5/2021 Matsumoto ............. G01S 13/08
(Continued)

FOREIGN PATENT DOCUMENTS

| KR | 10-1997-0026248 | 6/1997 |
| KR | 10-2013-0017285 | 2/2012 |
| KR | 10-2012-0020745 | 3/2012 |

OTHER PUBLICATIONS

Jungguue Lee et al., "SCC System Design using Speed Traffic Sign Recognition Information", Copyright 2018 KSAE, 18SKSAE_D065, pp. 782-786.

*Primary Examiner* — Babar Sarwar
(74) *Attorney, Agent, or Firm* — H.C. Park & Associates, PLC

(57) ABSTRACT

A smart cruise control (SCC) system based on complex information and a method of controlling the same. The method includes setting an SCC user-setting speed as a vehicle speed when an SCC function is turned on, driving a vehicle at the set vehicle speed, deriving vehicle speed limit information of a road section in which the vehicle is travelling from navigation speed limit information, road sign speed limit information, and surrounding vehicle speed information of the road section, and controlling the vehicle speed on the basis of the derived vehicle speed limit information.

18 Claims, 4 Drawing Sheets

(56) References Cited

U.S. PATENT DOCUMENTS

| | | | |
|---|---|---|---|
| 2010/0020170 A1* | 1/2010 | Higgins-Luthman | G06K 9/00791 348/135 |
| 2015/0166062 A1* | 6/2015 | Johnson | B60W 10/20 701/41 |
| 2016/0009296 A1* | 1/2016 | Iguchi | B60W 50/14 701/36 |
| 2016/0039411 A1* | 2/2016 | Park | G01S 13/87 701/70 |
| 2016/0193971 A1* | 7/2016 | Yellambalase | B60R 11/04 348/148 |
| 2016/0375905 A1* | 12/2016 | Park | B60W 30/16 701/96 |
| 2017/0021831 A1* | 1/2017 | De Smet | F01N 9/00 |
| 2017/0148320 A1* | 5/2017 | Ro | G06K 9/00818 |
| 2017/0287233 A1* | 10/2017 | Nix | G07C 5/08 |
| 2017/0291603 A1* | 10/2017 | Nakamura | B60W 30/095 |
| 2017/0349172 A1* | 12/2017 | Kubota | B60W 30/18163 |
| 2018/0015930 A1* | 1/2018 | Sarosi | B60W 50/00 |
| 2018/0345978 A1* | 12/2018 | Fujii | B60W 30/18163 |
| 2018/0346027 A1* | 12/2018 | Fujii | B62D 15/0255 |
| 2018/0348752 A1* | 12/2018 | Sakamoto | G06K 9/00805 |
| 2018/0370527 A1* | 12/2018 | Rachor | B60W 50/14 |
| 2019/0016340 A1* | 1/2019 | Bae | G08G 1/0112 |
| 2019/0069051 A1* | 2/2019 | Al-Stouhi | H04Q 9/04 |
| 2019/0071075 A1* | 3/2019 | Mimura | G08G 1/16 |
| 2019/0100199 A1* | 4/2019 | Ueda | B60W 30/0953 |
| 2019/0106108 A1* | 4/2019 | Wienecke | B60R 11/04 |
| 2020/0231145 A1* | 7/2020 | Song | G08G 1/167 |

* cited by examiner

VEHICLE SCC SYSTEM BASED ON COMPLEX INFORMATION AND METHOD OF CONTROLLING THE SAME

CROSS-REFERENCE TO RELATED APPLICATION

This application claims priority from and the benefit of Korean Patent Application No. 10-2019-0053342, filed on May 7, 2019, which is hereby incorporated by reference for all purposes as if set forth herein.

BACKGROUND

Field

Exemplary embodiments relate to an apparatus and method for controlling a vehicle smart cruise control (SCC) system, and more particularly, to an apparatus and method for controlling a vehicle SCC system on the basis of information from a navigation device, a camera, and a radar.

Discussion of the Background

As demand for the convenience and safety of vehicle drivers increases together with demand for improvement in vehicle performance, a driver assistance system (DAS), which assists, as a system in a vehicle, a driver by controlling the vehicle on the basis of information acquired from various sensors installed in the vehicle, is continuously being researched, developed, and applied to vehicles.

In this regard, a smart cruise control (SCC) system for controlling a vehicle to travel while maintaining a fixed distance from a preceding vehicle is attracting attention as a representative DAS. An SCC system according to the related art measures a distance from a preceding vehicle through a sensor installed in a vehicle and controls deceleration and acceleration of the vehicle on the basis of the speed of the preceding vehicle and the measured distance between the two vehicles so that the vehicle may travel safely without a driver's manipulation.

However, the SCC system according to the related art is mainly configured to operate in an environment in which the vehicle travels at high speed, such as an express way, and thus a driver is required to manually change the speed according to a change in the speed limit of an express way section. Also, the SCC function is not applied to common roads but rather to express ways.

The above information disclosed in this Background section is only for enhancement of understanding of the background of the invention and, therefore, it may contain information that does not constitute prior art.

SUMMARY

Exemplary embodiments of the present invention provide an apparatus and method for controlling a smart cruise control (SCC) system, which uses complex information from various sensors in a vehicle, so that the SCC function may be available on common roads as well as express ways.

Additional features of the invention will be set forth in the description which follows, and in part will be apparent from the description, or may be learned by practice of the invention.

According to an aspect of the present invention, there is provided a method of an SCC system on the basis of complex information, the method including setting an SCC user-setting speed as a vehicle speed when an SCC function is turned on, driving a vehicle at the set vehicle speed, deriving vehicle speed limit information of a road section in which the vehicle is travelling from navigation speed limit information, road sign speed limit information, and surrounding vehicle speed information of the road section, and controlling the vehicle speed on the basis of the derived vehicle speed limit information.

The navigation speed limit information may be derived from a navigation device and a global positioning system (GPS) device installed in the vehicle.

The road sign speed limit information may be derived from a road sign recognition camera in the vehicle.

The surrounding vehicle speed information may be derived from at least one surrounding vehicle recognition camera and a surrounding recognition sensor.

The controlling of the vehicle speed on the basis of the derived vehicle speed limit may include setting the SCC user-setting speed as the vehicle speed when the derived vehicle speed limit information is greater than or equal to the SCC user-setting speed and setting the derived vehicle speed limit as the vehicle speed when the derived vehicle speed limit information is less than the SCC user-setting speed.

The navigation speed limit information may be derived in consideration of a critical operation situation of the navigation device and whether the navigation device malfunctions.

The road sign speed limit information may be derived in consideration of a critical operation situation of the road sign recognition camera and whether the road sign recognition camera malfunctions.

The surrounding vehicle speed information may be determined on the basis of a target speed and a target quality which are sensor fusion information of the surrounding vehicle recognition camera and the surrounding recognition sensor.

According to another aspect of the present invention, there is provided a method of controlling an SCC system on the basis of complex information, the method including determining whether a radar error occurs and determining whether a camera error occurs when a radar error does not occur, determining whether a first path navigation error occurs when it is determined that a radar error does not occur, deriving one of camera speed limit information derived through a camera and navigation speed limit information derived through a navigation device as a vehicle speed limit through a comparison of weights of the camera speed limit information and the navigation speed limit information when it is determined that a first path navigation error does not occur, deriving the camera speed limit information as a vehicle speed limit when it is determined that a first path navigation error occurs, and setting an SCC vehicle speed on the basis of the derived vehicle speed limit.

The method may further include determining whether a radar error occurs and turning off an SCC function when it is determined that a radar error occurs.

The method may further include determining whether a second path navigation error occurs when it is determined that a camera error occurs, setting the vehicle speed limit as the navigation speed limit of the navigation device when it is determined that a second path navigation error does not occur, and determining a surrounding vehicle speed when it is determined that a second path navigation error occurs.

The determining of the surrounding vehicle speed may include comparing a sensor fusion value, which is surrounding vehicle information, with a surrounding vehicle threshold value, deriving the surrounding vehicle speed when the sensor fusion value is greater than the surrounding vehicle threshold value, and maintaining a user-setting speed when the sensor fusion value is less than or equal to the surrounding vehicle threshold value.

According to another aspect of the present invention, there is provided a vehicle SCC system based on complex information, the vehicle SCC system including a navigation information processor configured to derive navigation speed limit information from speed limit information of a road section, in which a vehicle is travelling, received from a navigation device and critical operation information of the navigation device, a traffic signal recognition (TSR) processor configured to derive TSR speed limit information from speed limit information of the road section received from a TSR camera and critical operation information of the TSR camera, a surrounding vehicle sensing information processor configured to derive surrounding vehicle speed information from speed information of at least one surrounding vehicle received from a surrounding vehicle sensor, a vehicle speed limit deriver configured to derive vehicle speed limit information of the road section from the navigation speed limit information, the TSR speed limit information, and the surrounding vehicle speed information, and an SCC controller configured to control a vehicle speed on the basis of the derived vehicle speed limit information.

The vehicle speed limit deriver may derive the vehicle speed limit information of the road section from whether a radar malfunctions, whether the navigation device malfunctions, and whether the TSR camera malfunctions.

It is to be understood that both the foregoing general description and the following detailed description are exemplary and explanatory and are intended to provide further explanation of the invention as claimed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
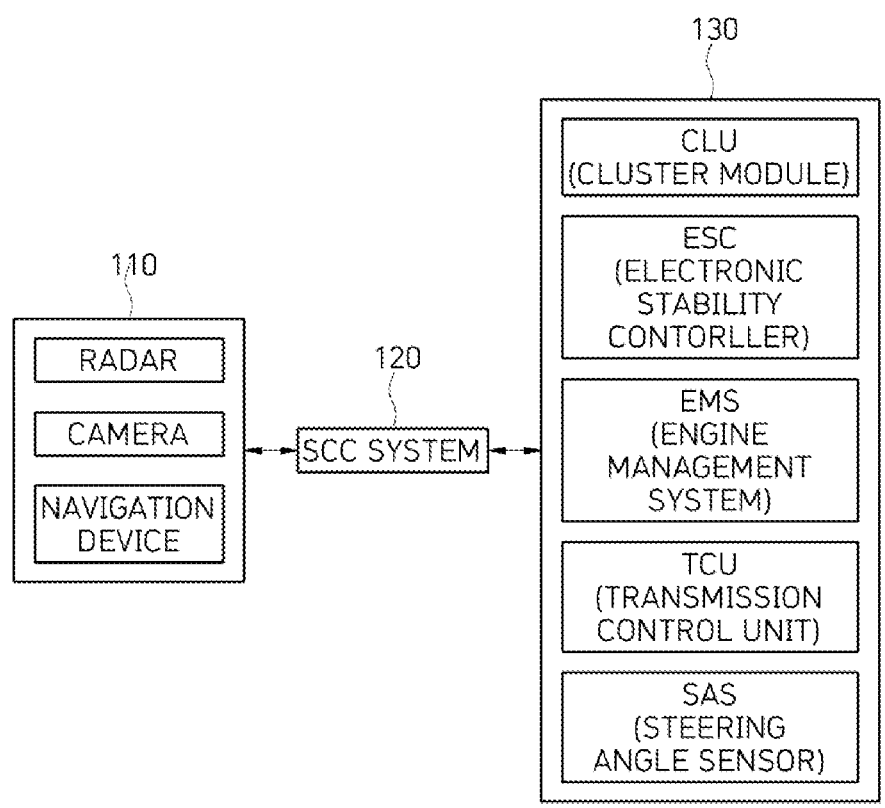
FIG. 1 is a block diagram illustrating a smart cruise control (SCC) system according to a related art.

Since the present invention may be variously modified and have various embodiments, some embodiments will be illustrated in the drawings and described in detail. However, this is not intended to limit the present invention to specific embodiments, and it should be understood that the scope of the present invention covers all the modifications, alterations, equivalents, and substitutes within the technical spirit of the present invention derived from the embodiments.

Although the terms, such as first and second, may be used to describe various elements, the elements should not be limited by the terms. The terms are used only to distinguish one element from other elements. For example, without departing from the scope of the present invention, a first element may be termed a second element, and similarly, a second element may be termed a first element. The term "and/or" includes any one or all combinations of a plurality of associated listed items.

It is to be understood that when an element is referred to as being "connected" or "coupled" to another element, the element may be directly connected or coupled to the other element or an intermediate element may be present. It is to be understood that there is no intermediate element only when an element is referred to as being "directly connected" or "directly coupled" to another element.

Terminology used in this specification is for the purpose of describing embodiments set forth herein and is not intended to limit the present invention. Unless the context clearly indicates otherwise, the singular forms include the plural forms as well. It is to be understood that the terms "include," "have," etc., when used herein, specify the presence of stated features, integers, steps, operations, elements, parts, and combinations thereof and do not preclude the presence or addition of one or more other features, integers, steps, operations, elements, parts, and combinations thereof.

All terms including technical and scientific terms used herein have the same meaning as commonly understood by those of ordinary skill in the art to which the present invention pertains and should not be interpreted in an idealized or overly formal sense. When any term is defined in this specification, the term should be interpreted accordingly.

Hereinafter, exemplary embodiments of the present invention will be described in detail with reference to the accompanying drawings. In describing the present invention, to aid in overall understanding of the present invention, the same elements may have the same reference numeral, and descriptions of the same elements will not be reiterated.

As shown in FIG. 1, a smart cruise control (SCC) system 120 according to a related art controls a vehicle by receiving signals from various sensors (including a radar, a camera, and a navigation device) 110 in the vehicle and performs SCC according to whether there is a preceding vehicle.

When there is a preceding vehicle, the SCC system 120 receives target information (a target type, a relative distance, a relative speed, etc.) of the preceding vehicle from the sensors, determines danger on the basis of vehicle information (a vehicle speed, a steering angle, a steering angle speed, etc.) as well as the target information, and controls the amount of deceleration or acceleration.

On the other hand, when there is no preceding vehicle, the SCC system 120 receives information of a speed manually set by a driver from a cluster module CLU and transmits a control signal to a vehicle control system 130 to accelerate and/or maintain the vehicle speed.

In the SCC system 120, safety is top priority. Therefore, even when the set speed input by the driver is higher than the current vehicle speed, the SCC system 120 detects information on a relative speed of a preceding vehicle and a relative distance between the two vehicles and determines the degree of danger of accident on the basis of the detected information. When the degree of danger of accident is high, the SCC system 120 controls to reduce and/or maintain the vehicle speed while maintaining the relative distance from the preceding vehicle.

Meanwhile, when the vehicle travels on a road, such as an express way, road sections may have different speed limits. In this case, the SCC system 120 performs SCC in consideration of such speed limits according to road sections on the basis of speed information on a road sign (including a traffic sign) recognized by the camera, which is one of the sensors 110 in the vehicle, or speed information received from the navigation device.

In other words, when there is no preceding vehicle in front of the vehicle, the SCC system 120, which recognizes speed information written on a road sign on a road through the camera 110 in the vehicle (traffic signal recognition (TSR)) and controls the vehicle in consideration of the speed limit of a corresponding road section, may recognize the speed limit of the corresponding road section through the camera 110 and control the vehicle speed using the information (this is referred to as a TSR-based SCC system).

Also, while driving on a road using the navigation device among the vehicle sensors 110, the SCC system 120 may control the vehicle speed on the basis of speed limit information provided according to road sections. As such, when an SCC system is used to take speed limits, which are recognized by a camera and a navigation device according to road sections, into consideration, it is possible to use the SCC function on common roads as well as express ways.

According to an exemplary embodiment of the present invention, TSR information may be used in an SCC system as shown in Table 1.

TABLE 1

| No. | Driving Condition | Equation | Other |
|---|---|---|---|
| | Express Way | Vset (SCC) = VTSR (CAM | Navi) | SCC speed control with priority to navigation information |
| | City Street | Vset (SCC) = VTSR (Navi | CAM) | SCC speed control with priority to camera information |
| | No Signal Receiving | Vset (SCC) = Vtsr(Navi) | (VTSR(CAM)*f(cnt)) | |

Here, Vset(SCC) denotes a control speed value which is finally set by the SCC function, and Vtsr denotes a speed limit received by an SCC system when a speed limit sign is present. (X|Y) denotes an event of a value X being received when an event Y occurs. f(cnt) denotes the count of reliable information.

For example, Vset (SCC)=VTSR (Navi|CAM) denotes a speed value finally set by SCC when a CAM event (the speed limit information of a road sign being received from a camera) and a Navi event (speed limit information being received from a navigation device) occur.

General navigation information leads to transmission signals having clear characteristics, such as whether a fixed speed camera is present, whether a mobile speed camera is present, and a change in speed limit, and has a relatively low frequency of occurrence. On the other hand, road sign information which is transmitted as a recognition result of a camera in a vehicle has a much higher frequency of occurrence than the above-described navigation information and is highly likely to be missed due to surrounding vehicles covering the road sign.

Therefore, in camera-based speed control without navigation information, it is necessary to perform reliable SCC by considering the number of occurrences of road sign information (it is necessary to set the frequency of camera information after verifying the reliability of a path).

In an SCC system based on road sign speed limit recognition using a camera in a vehicle (a TSR-based SCC system), the SCC function is activated at all times. When a speed set by a driver is lower than a speed limit of a corresponding road section while the SCC function is in operation, the speed set by the driver is maintained. When the speed set by the driver is higher than the speed limit of the corresponding road section, the speed set by the driver is changed to the speed limit of the corresponding road section.

In a TSR-based SCC system, when a driver terminates SCC after TSR-based speed limit control, speed control is performed at a previously set speed. Since preceding vehicle follow-up control takes precedence in the SCC system, a speed control SCC function may operate only when a preceding vehicle is not present, and the driver's selection of a function may take precedence so that SCC speed control may finally be performed. Alternatively, when the SCC function is turned on, SCC speed control may be performed using TSR information while an appropriate distance is maintained from a preceding vehicle.

Meanwhile, when the above-described SCC systems based on navigation information and TSR information are used, due to a road condition for driving, a malfunction and/or a trouble of a sensor in a vehicle, or the like, speed limit information of a road section in which the vehicle travels may not be recognized properly, or the situations of surrounding vehicles may not be recognized properly.

For example, even when a camera, a navigation device, or the like operates normally without trouble and/or malfunctioning, in an environment, such as a tunnel, navigation information may not be smoothly received, and speed limit information of a corresponding road section may not be recognized due to a large vehicle or the like covering a road sign.

Also, distance from surrounding vehicles, movement of surrounding vehicles, etc. may not be detected properly due to trouble and/or malfunctioning of front, rear, left, and right side sensors in the vehicle. A vehicle SCC system based on complex information for solving these problems will be described below according to an exemplary embodiment of the present invention.

Figure 2:
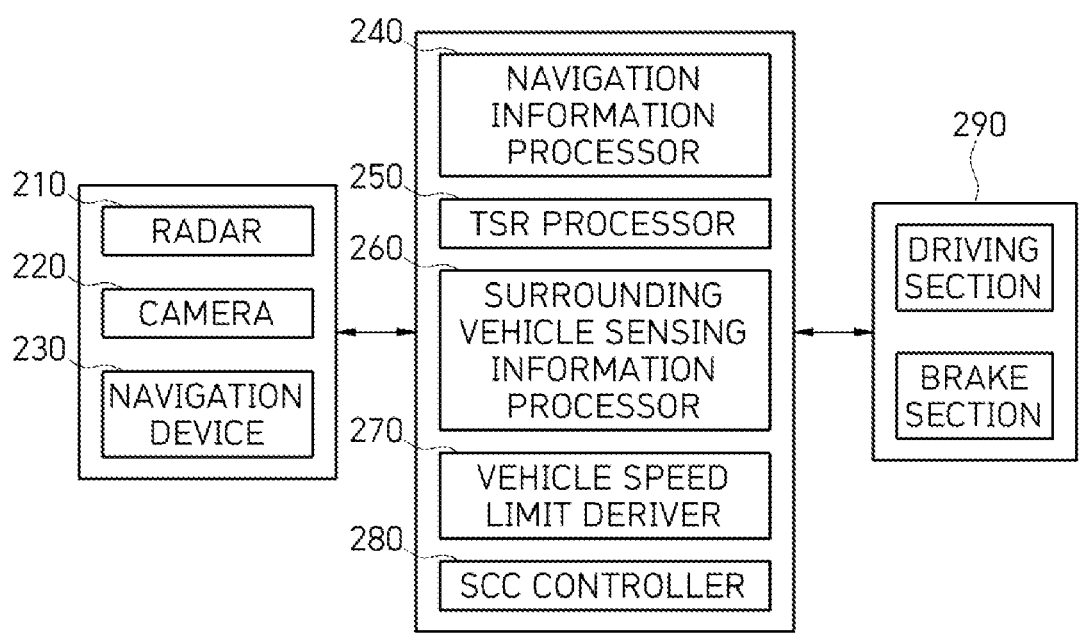
FIG. 2 is a block diagram illustrating a vehicle SCC system based on complex information according to an exemplary embodiment of the present invention.

FIG. 2 is a block diagram illustrating a vehicle SCC system based on complex information according to an exemplary embodiment of the present invention.

Referring to FIG. 2, the vehicle SCC system based on complex information according to the exemplary embodiment of the present invention is intended to perform a safe SCC operation in consideration of the reliability, limits, etc. of speed limit information and surrounding vehicle speed information recognized by various sensors installed in a vehicle (collectively referred to as "complex information").

In the vehicle SCC system according to the exemplary embodiment of the present invention, a navigation information processor 240 receives speed limit information of a road section in which the vehicle is travelling from a navigation device 230 installed in the vehicle. The navigation information processor 240 may receive local information of the road section in which the vehicle is travelling and/or front and rear road sections and information on a navigation operation error area (e.g., a tunnel) from the navigation device 230.

The navigation information processor 240 according to the exemplary embodiment of the present invention may derive critical navigation signal receiving situation information from the received local information of the road section and the received information on the operation error area. Also, the navigation information processor 240 according to the exemplary embodiment of the present invention may derive critical navigation signal receiving situation information from information on a global positioning system (GPS)

signal receiving state of the navigation device 230 (e.g., signal delay, no signal receiving and/or the like in a downtown area).

Examples of critical navigation signal receiving situation information may be information on a local situation in which navigation is unavailable (a tunnel, an area without associated communication equipment, etc.), information on a critical signal receiving situation (signal delay, no signal receiving, etc. due to skyscrapers in a downtown area), navigation trouble information, and the like.

The navigation information processor 240 may transfer navigation speed limit information including the above-described operation error area information, critical navigation signal receiving situation information, and local information of the road section to a vehicle speed limit deriver 270 which will be described below.

In the vehicle SCC system according to the exemplary embodiment of the present invention, at least one camera 220 is used to recognize a road sign. Information on a speed limit included in a road sign image which is recognized and transferred by the camera 220 may be recognized by a TSR processor 250 of the vehicle SCC system according to the exemplary embodiment of the present invention and transferred to an SCC controller 280.

Also, the TSR processor 250 according to the exemplary embodiment of the present invention may derive information on a critical camera operation situation from image information received from the camera 220. Examples of the information on a critical camera operation situation may be information on the occurrence of camera blockage, information on a decrease in recognition rate caused by surroundings (a blurred image), information on a decrease in recognition rate caused by an illumination environment (low illumination), information on disturbance caused by surrounding vehicles and obstacles, camera trouble information, and the like.

In other words, the information on a critical camera operation situation denotes information on whether it is not possible to photograph a road sign due to a vehicle, an obstacle, or the like which is present in a camera direction, information on whether the road environment lacks illumination, information on whether the road is foggy, and the like (besides, various critical situations may be applied according to implementation).

Meanwhile, such information on a critical camera operation situation may be derived by the TSR processor 250 from the image information received from the camera 220 or may be generated by the camera 220 together with the image information and received from the camera 220. Also, the TSR processor 250 may transfer road sign speed limit information including the information on a speed limit recognized from a road sign and the information on a critical camera operation situation to the vehicle speed limit deriver 270 which will be described below.

In the vehicle SCC system according to the exemplary embodiment of the present invention, at least one radar 210 is used to measure distances from surrounding vehicles and speeds of the surrounding vehicles. In the vehicle SCC system according to the exemplary embodiment of the present invention, a radar may include a light detection and ranging (LiDAR) and an ultrasonic sensor.

A surrounding vehicle sensing information processor 260 of the vehicle SCC system according to the exemplary embodiment of the present invention receives a signal which is transmitted from the radar 210 and determines whether a surrounding vehicle is present within a certain distance, the speed of a surrounding vehicle, the distance from the surrounding vehicle, and the like.

Subsequently, the surrounding vehicle sensing information processor 260 according to the exemplary embodiment of the present invention may derive surrounding vehicle speed information from sensor fusion (SF) information (SF in a driver assistance system (DAS) is a technology for rapidly coping with a change in driving environment by combining sensors (including the LiDAR, the ultrasonic sensor, etc.) in a vehicle).

The surrounding vehicle speed information derived from the SF information by the surrounding vehicle sensing information processor 260 according to the exemplary embodiment of the present invention includes surrounding vehicle speed and the number of surrounding vehicles (the surrounding vehicle speed information comprehensively indicates the degree of congestion of surrounding vehicles, speeds of the surrounding vehicles (including negative and positive margins of error), and distance from the surrounding vehicles).

Subsequently, the surrounding vehicle sensing information processor 260 according to the exemplary embodiment of the present invention transfers whether a surrounding vehicle is present, the speed of a surrounding vehicle, the distance from the surrounding vehicle, whether there is sensor trouble in the vehicle, and the SF information to the vehicle speed limit deriver 270 which will be described below.

The vehicle speed limit deriver 270 of the vehicle SCC system according to the exemplary embodiment of the present invention derives vehicle speed limit information over the road in which the vehicle is running is derived on the basis of navigation speed limit information, road sign speed limit information, and surrounding vehicle speed information received from.

Specifically, the vehicle speed limit deriver 270 gives a weight not only to the speed limit information of the road section included in the received navigation speed limit information but also to a critical navigation signal receiving situation according to a situation and uses the weights in setting a final vehicle speed limit.

As an example of giving a weight according to a critical navigation signal receiving situation, a weight for a local situation in which navigation is unavailable may be W_garea (since the situation in which navigation is unavailable is a serious consideration, a weight of 1 may be given (W_garea=1)), and a weight for a critical signal receiving situation may be W_gqual so that a final weight W_gfinal for a critical navigation signal receiving situation may not exceed 1 (W_gfinal=(W_garea+W_gqual)≤1).

Also, the vehicle speed limit deriver 270 gives a weight not only to the speed limit information of the road section included in the received road sign speed limit information but also to the information on a critical camera operation situation according to a situation and uses the weights in setting a final vehicle speed limit.

As an example of giving a weight according to a critical camera operation situation, a weight for camera blockage may be W_cblock (since camera blockage is a serious consideration, a weight of 1 may be given (W_cblock=1)).

The final weight sum of W_cfinal for a critical camera operation situation which is the sum of a weight for a decrease in recognition rate caused by surroundings W_cblur, a weight for a decrease in recognition rate caused by illumination W_cLL, and a weight for surrounding vehicles' and obstacles' blockage W_cdis (W_cdis=u(0, 1)

according to a uniform distribution) may not exceed 1 ($W\_cfinal=W\_cblock+W\_cLL+W\_cdis \leq 1$).

Also, the vehicle speed limit deriver 270 also uses whether the camera 220 malfunctions, whether the radar 210 malfunctions, and whether the GPS malfunctions (with regard to the navigation device 230) in determining a final vehicle speed limit.

The SCC controller 280 of the vehicle SCC system according to the exemplary embodiment of the present invention receives the vehicle speed limit information from the vehicle speed limit deriver 270, compares the vehicle speed limit information with an SCC user-setting speed set by a current driver, and controls the vehicle speed. The SCC controller 280 according to the exemplary embodiment of the present invention changes or maintains the actual speed of the vehicle through a driving section and a brake section of a vehicle control system 290 (to the contrary, the SCC controller 280 may be implemented to directly control the driving section and the brake section).

As an example of operation of the SCC controller 280, the SCC controller 280 may compare the vehicle speed limit information derived by the vehicle speed limit deriver 270 with the SCC user-setting speed set by the user and may set the SCC user-setting speed as the vehicle speed when the vehicle speed limit information is the SCC user-setting speed or higher.

Also, the SCC controller 280 may compare the vehicle speed limit information derived by the vehicle speed limit deriver 270 with the SCC user-setting speed set by the user and may set the derived vehicle speed limit as the vehicle speed when the vehicle speed limit information is lower than the SCC user-setting speed (however, even when the vehicle speed limit information is lower than the SCC user-setting speed, the vehicle speed limit may be maintained at the SCC user-setting speed as necessary). A method of controlling a vehicle SCC system on the basis of complex information will be described below according to an exemplary embodiment of the present invention.

Figure 3:
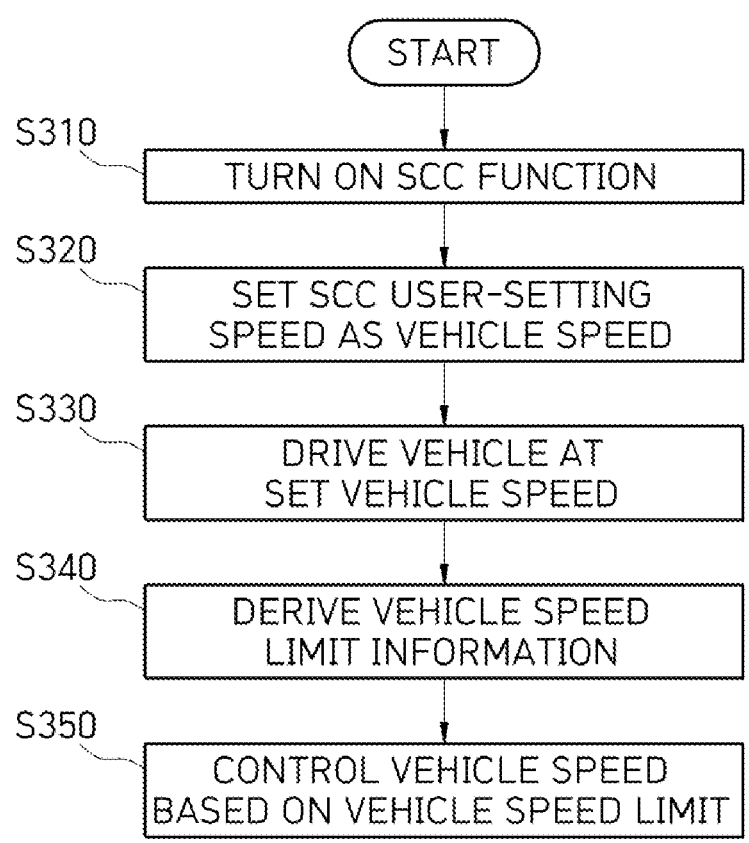
FIG. 3 is a flowchart illustrating a method of controlling a vehicle SCC system on the basis of complex information according to an exemplary embodiment of the present invention.

FIG. 3 is a flowchart illustrating a method of controlling a vehicle SCC system on the basis of complex information according to an exemplary embodiment of the present invention.

The method of controlling a vehicle SCC system on the basis of complex information according to the exemplary embodiment of the present invention illustrated in FIG. 3 is a method of controlling a vehicle SCC system using the vehicle SCC system based on complex information according to the exemplary embodiment of the present invention illustrated in FIG. 2.

First, a driver turns on the SCC function (S310). When the driver sets an SCC user-setting speed to a desired speed, the SCC controller 280 sets the SCC user-setting speed as the speed of a vehicle (S320). The vehicle control system 290 drives the vehicle by controlling the driving section and the brake section at the set vehicle speed (S330).

While the vehicle is running at the vehicle speed set in the previous operation with the SCC function turned on, a change in the speed limit of a road section in which the vehicle is travelling may be recognized, the speeds or number of surrounding vehicles may be changed, malfunction of a sensor may be recognized in the vehicle, or a critical operation situation of a sensor may be recognized. In this case, vehicle speed limit information is derived using a method of setting a vehicle speed limit which is illustrated in FIG. 4 (S340).

Specifically, the vehicle speed limit deriver 270 according to the exemplary embodiment of the present invention derives vehicle speed limit information of the road section in which the vehicle is travelling from navigation speed limit information, road sign speed limit information, and surrounding vehicle speed information received as described above.

Figure 4:
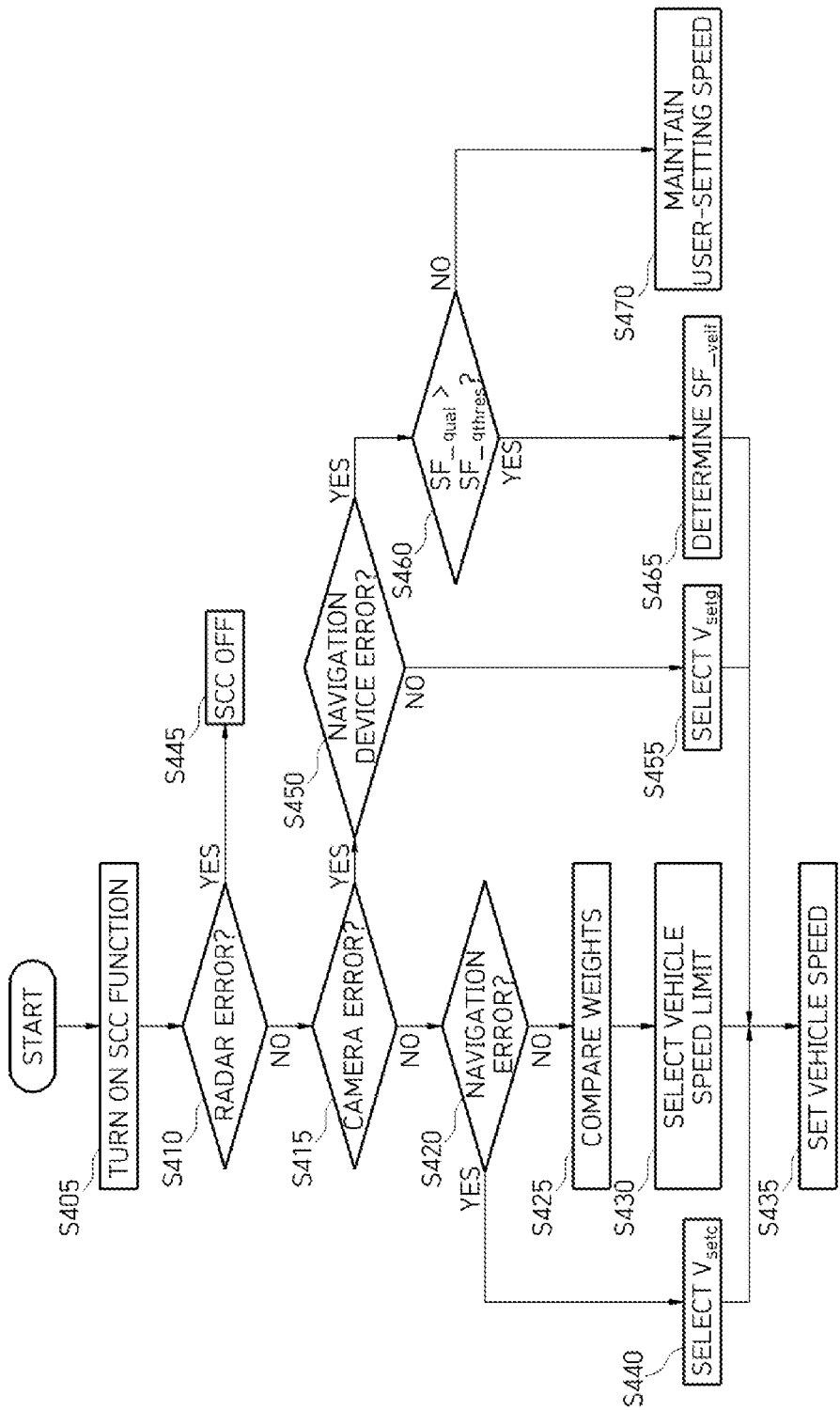
FIG. 4 is a flowchart illustrating a method of setting a vehicle speed limit according to an exemplary embodiment of the present invention in the method of controlling a vehicle SCC system on the basis of complex information.

Since the information includes weight information of each critical operation situation, the vehicle speed limit deriver 270 determines the reliability of the received speed limit information using the information of critical operation situations together and sets a vehicle speed limit using the method of setting a vehicle speed limit according to an exemplary embodiment of the present invention illustrated in FIG. 4.

The SCC controller 280 and the vehicle control system 290 according to the exemplary embodiment of the present invention control the vehicle speed on the basis of the derived vehicle speed limit information (S350). As an example of vehicle speed control, the vehicle speed limit information derived by the vehicle speed limit deriver 270 is compared with the SCC user-setting speed set by the driver, and when the vehicle speed limit information is the SCC user-setting speed or higher, the SCC user-setting speed may be set as the vehicle speed.

Also, the vehicle speed limit information derived by the vehicle speed limit deriver 270 is compared with the SCC user-setting speed set by the driver, and when the vehicle speed limit information is lower than the SCC user-setting speed, the derived vehicle speed limit may be set as the vehicle speed (however, even when the vehicle speed limit information is lower than the SCC user-setting speed, the vehicle speed limit may be maintained at the SCC user-setting speed as necessary).

Meanwhile, the method of controlling a vehicle SCC system on the basis of complex information according to the exemplary embodiment of the present invention illustrated in FIG. 3 relates to a case of controlling a vehicle speed in consideration of vehicle speed limit information while a vehicle is running at a vehicle speed set by a driver after the SCC function is turned on. However, before the SCC function is turned on, vehicle speed limit information may be received first, and after the SCC function is turned on, an SCC user-setting speed of the driver may be compared with the vehicle speed limit information so that vehicle speed control may be performed properly.

Alternatively, when the SCC function is turned on, vehicle speed limit information may be received in advance before the driver sets an SCC user-setting speed, and the vehicle speed limit information may be compared with the SCC user-setting speed set by the driver so that vehicle speed control may be performed properly. A method of setting a vehicle speed limit will be described below according to an exemplary embodiment of the present invention.

FIG. 4 is a flowchart illustrating a method of setting a vehicle speed limit in the method of controlling a vehicle SCC system on the basis of complex information according to an exemplary embodiment of the present invention.

The method of setting a vehicle speed limit according to the exemplary embodiment of the present invention in the method of controlling a vehicle SCC system on the basis of complex information relates to a method of selecting one of a plurality of pieces of vehicle speed limit information as a vehicle speed limit in the method of controlling a vehicle SCC system on the basis of complex information according to the exemplary embodiment of the present invention illustrated in FIG. 3.

When the SCC function is turned on (S405), the vehicle is driven at an SCC user-setting speed set by the driver. To check information on surrounding vehicles first, it is is determined whether a radar error occurs (S410). When a radar error occurs (YES in S410), the SCC function is turned off (S445). This is because the driver is required to manually drive the vehicle in order to ensure safety when it is not possible to recognize information on surrounding vehicles through the radar 210.

When it is determined that a radar error does not occur (NO in S410), it is determined whether a camera error occurs to recognize road sign information (S415). In other words, the TSR processor 250 (alternatively, the camera 220 itself or the vehicle speed limit deriver 270) may determine whether the camera 220 malfunctions.

When it is determined that a camera error does not occur (NO in S415), it is determined whether a navigation device error occurs (this is referred to as a first path navigation error determination) (S420). When the first path navigation error does not occur (NO in S420; in case of camera is normal and navigation device is normal), road sign speed limit information reflecting a weight for a critical camera operation situation is compared with navigation speed limit information reflecting a weight for a critical navigation operation situation, and one of the road sign speed limit and the navigation speed limit is selected as a vehicle speed limit (S430).

In other words, although the camera 220 or the navigation device 230 does not malfunction, one of the camera speed limit information and the navigation speed limit information is selected by comparing the above-described final weight W_cfinal for a critical camera operation situation with the above-described final weight W_gfinal for a critical navigation signal receiving situation to determine the reliability of the camera speed limit information and the navigation speed limit information. Subsequently, the selected speed limit is set as the speed of the vehicle (S435) to control the vehicle.

When it is determined in the first path navigation error determination operation that a navigation device error occurs (YES in S420; in case of camera is normal and navigation device is abnormal), the camera speed limit indicated by the camera speed limit information is selected as a vehicle speed limit (referred to as Vsetc selection) (S440). Subsequently, the selected camera speed limit is set as the speed of the vehicle (S435) to control the vehicle.

When it is determined in the camera error determination operation that a camera error occurs (YES in S415), it is determined whether navigation device error occurs (S450; referred to as a second path navigation error determination).

When it is determined in the second path navigation error determination operation that a second path navigation error does not occur (NO in S450; in case of camera is abnormal and navigation device is normal), the navigation speed limit indicated by the navigation speed limit information is selected as the vehicle speed limit (referred to as Vsetg selection) (S455).

When it is determined in the second path navigation error determination operation that a second path navigation error occurs (YES in S450; in case of camera is abnormal and navigation device is abnormal), the vehicle speed limit is derived from surrounding vehicle speed information. Specifically, surrounding vehicle speed information, which comprehensively indicates the degree of congestion of surrounding vehicles, speeds of the surrounding vehicles (including negative and positive margins of error), and distance from the surrounding vehicles, is acquired through the fusion of sensors, such as a radar (a LiDAR, an ultrasonic sensor, a camera, etc.), installed in the vehicle, and the vehicle speed limit is derived from the surrounding vehicle speed information.

As an example of a method of acquiring the surrounding vehicle speed information, an SF extraction value SF_qual, which is surrounding vehicle information, is compared with an SF threshold value SF_qthres which is a surrounding vehicle threshold value (S460), and when SF_qual is less than or equal to (or just less than) SF_qthres (NO in S460), the SCC user-setting speed set by the driver is maintained (S470).

On the other hand, when SF_qual is greater than (or greater than or equal to) SF_qthres (YES in S460), a surrounding vehicle speed SF_velf is derived from a speed SF_velM of a preceding vehicle, speeds SF_vels of other surrounding vehicles, and weights for the speeds (a weight W_M for the preceding vehicle and weights W_s for the other surrounding vehicles) (S465). Then, the derived surrounding vehicle speed SF_velf is set as the vehicle speed (S435).

An example of surrounding vehicle speeds and surrounding vehicle qualities for calculating the surrounding vehicle speed SF_velf according to an exemplary embodiment of the present invention is shown in Table 2.

TABLE 2

| Item | Detailed Description |
|---|---|
| Speed of Preceding Vehicle | SF_velM |
| Speeds of Other Vehicles | SF_vels |
| Weight for Preceding Vehicle | W_M (e.g., W_M = 0.8) |
| Weights for Other Vehicles | W_s<br>Weight sum according to number of surrounding targets/sum(W_M, W_s) = 1 |
| Surrounding Vehicle Speed | SF_velf = Round (W_M × SF_velM + sum(W_s × SF_Vels)) |
| Surrounding Vehicle Quality Information | SF_qual = 1: when preceding vehicle is present<br>SF_qual = 0.3: when one surrounding vehicle is present excluding preceding vehicle<br>SF_qual = 0.5: when two surrounding vehicles are present excluding preceding vehicle<br>SF_qual = 0.8: when three or more surrounding vehicles are present excluding preceding vehicle |

According to the SCC function, a criterion for judging a dangerous situation is "a vehicle present in front of a subject vehicle." Therefore, when there is a preceding vehicle, a large preceding vehicle weight (e.g., W_M=0.8) is given to "information" on the preceding vehicle, that is, a "speed value" of the preceding vehicle (a value acquired through the sensor fusion), to derive the surrounding vehicle speed.

The above-described method of setting a vehicle speed limit according to the exemplary embodiment of the present invention in the method of controlling an SCC system on the basis of complex information has a logic representation shown in Table 3.

TABLE 3

| Selected Vehicle Speed Limit | Condition |
| --- | --- |
| Vset = VsetG<br>Vehicle Speed Limit = Navigation Speed Limit | If((1 − W_cfinal) < (1 − W_gfinal))&&(~Fail_c && ~Fail_G) |
| Vset = Vsetc<br>Vehicle Speed Limit = Camera Speed Limit | If((1 − W_cfinal) > (1 − W_gfinal))&&(~Fail_c && ~Fail_G) |
| Vset = Vsetsf<br>Vehicle Speed Limit = Surrounding Vehicle Speed | If((1 − W_cfinal) < W_cthres)&&(1 − W_gfinal) < W_gthres)&&(~Fail_c && ~Fail_G && ~Fail_R) |

W_cfinal: a final critical camera operation situation weight which is a weight for a critical camera operation situation (a maximum of 1)
W_gfinal: a final critical navigation operation situation weight
W_cthres: a camera threshold weight which is a threshold value for camera reliability (when the reliability of camera information is lower than the threshold value, the speed is estimated using an SF value)
W_gthres: a navigation threshold weight
Fail_c: camera error occurrence ("~" denotes a negative logic)
Fail_G: navigation error occurrence
Fail_R: radar error occurrence Although the above-described elements have been described as separate devices, the description is merely exemplary for convenience of description and better understanding, and the elements may be implemented in various forms within the technical scope of the present invention. For example, the vehicle speed limit deriver 270 and the SCC controller 280 may be integrated into one module or divided into two or more devices.

According to the present invention, an SCC system of a vehicle can control the vehicle in consideration of speed limits according to road sections on the basis of navigation information and road sign information. Also, the SCC function can be applied to common roads as well as express ways.

Methods according to exemplary embodiments of the present invention can be implemented in the form of program commands, which can be executed by various computing devices, and recorded in a computer-readable medium. The computer-readable medium may include program commands, data files, data structures, etc. separately or in combination. The program commands recorded in the computer-readable medium may be specially designed or structured for the present invention or well-known and available to those of ordinary skill in the field of computer software.

Examples of the computer-readable medium include hardware devices, such as a read only memory (ROM), a random access memory (RAM), and a flash memory, specially designed to store and execute program commands. Examples of the program commands include not only a machine language code generated by a compiler but also a high level language code executable by a computer using an interpreter. The above-described hardware devices may be configured to operate as at least one software module to perform operation of the present invention, and vice versa.

The methods according to the present invention may be implemented in the computer system. The computer system may include at least one of processor, memory, user input device, data communication bus, user output device, and storage. Each component of the computer system communicates with the data commnication bus.

The present invention has been described in detail above with reference to the exemplary embodiments. However, the above-described embodiments are merely examples, and the scope of the present invention is not limited thereto. Those of ordinary skill in the technical field to which the present invention pertains should be able to make various modifications and alterations from the above description within the technical spirit of the present invention. Therefore, the scope of the present invention should be defined by the following claims.

What is claimed is:

1. A method of controlling a vehicle smart cruise control (SCC) system on the basis of complex information, the method comprising:
    setting an SCC user-setting speed as a vehicle speed when an SCC function is turned on;
    driving a vehicle at the set vehicle speed;
    deriving vehicle speed limit information of a road section in which the vehicle is travelling from navigation speed limit information, road sign speed limit information, and surrounding vehicle speed information of the road section;
    controlling the vehicle speed on the basis of the derived vehicle speed limit information,
    wherein the navigation speed limit information is derived from a navigation device and a global positioning system (GPS) device installed in the vehicle, and
    wherein the navigation speed limit information is derived in consideration of a critical operation situation of the navigation device and whether the navigation device malfunctions.

2. The method of claim 1, wherein the road sign speed limit information is derived from a road sign recognition camera in the vehicle.

3. The method of claim 2, wherein the road sign speed limit information is derived in consideration of a critical operation situation of the road sign recognition camera and whether the road sign recognition camera malfunctions.

4. The method of claim 1, wherein the surrounding vehicle speed information is derived from at least one surrounding vehicle recognition camera and a surrounding recognition sensor.

5. The method of claim 4, wherein the surrounding vehicle speed information is determined on the basis of a target speed and a target quality which are sensor fusion information of the surrounding vehicle recognition camera and the surrounding recognition sensor.

6. The method of claim 1, wherein the controlling of the vehicle speed on the basis of the derived vehicle speed limit comprises:
   setting the SCC user-setting speed as the vehicle speed when the derived vehicle speed limit information is greater than or equal to the SCC user-setting speed; and
   setting the derived vehicle speed limit as the vehicle speed when the derived vehicle speed limit information is less than the SCC user-setting speed.

7. The method of claim 1, wherein the vehicle speed limit information is received before setting the SCC user-setting speed.

8. A method of controlling a vehicle smart cruise control (SCC) system on the basis of complex information, the method comprising:
   enabling complex information acquisition including radar, camera, and navigation information;
   determining whether a radar error occurs and, when a radar error does not occur, determining whether a camera error occurs;
   when it is determined that the camera error does not occur, setting a vehicle speed based on determinations made regarding the camera error, navigation device error, and radar detection, wherein determining the vehicle speed further includes:
   determining whether a first path navigation error occurs;
   when it is determined that the first path navigation error does not occur, selecting one of camera speed limit information derived through a camera and navigation speed limit information derived through a navigation device as a vehicle speed limit through a comparison of weights of the camera speed limit information and the navigation speed limit information;
   when it is determined that the first path navigation error occurs, selecting the camera speed limit information as the vehicle speed limit; and
   setting an SCC vehicle speed on the basis of the derived vehicle speed limit.

9. The method of claim 8, further comprising:
   updating the vehicle speed limit based on repeated determination of camera error and navigation device error.

10. The method of claim 8, further comprising:
    determining whether the radar error occurs and turning off an SCC function when it is determined that the radar error occurs.

11. The method of claim 8, further comprising:
    when it is determined that the camera error occurs, determining whether a second path navigation error occurs;
    when it is determined that the second path navigation error does not occur, setting the vehicle speed limit as the navigation speed limit derived through the navigation device; and
    when it is determined that the second path navigation error occurs, determining a surrounding vehicle speed.

12. The method of claim 11, wherein the determining of the surrounding vehicle speed comprises:
    comparing a sensor fusion value, which is surrounding vehicle information, with a surrounding vehicle threshold value;
    deriving the surrounding vehicle speed when the sensor fusion value is greater than the surrounding vehicle threshold value; and
    maintaining a user-setting speed when the sensor fusion value is less than or equal to the surrounding vehicle threshold value.

13. The method of claim 12, further comprising:
    setting the vehicle speed as the derived surrounding vehicle speed when the sensor fusion value is greater than then surrounding vehicle threshold value.

14. The method of claim 12, wherein surrounding vehicle information includes a degree of congestion of surrounding vehicles, speeds of the surrounding vehicles, and distance of the surrounding vehicles.

15. A vehicle smart cruise control (SCC) system based on complex information, the SCC system comprising:
    a navigation information processor configured to derive navigation speed limit information of a road section, in which a vehicle is travelling, received from a navigation device and critical operation information of the navigation device;
    a traffic signal recognition (TSR) processor configured to derive TSR speed limit information from speed limit information of the road section received from a TSR camera and critical operation information of the TSR camera;
    a surrounding vehicle sensing information processor configured to derive surrounding vehicle speed information from speed information of at least one surrounding vehicle received from a surrounding vehicle sensor;
    a vehicle speed limit deriver configured to derive vehicle speed limit information of the road section from the navigation speed limit information, the TSR speed limit information, and the surrounding vehicle speed information; and
    an SCC controller configured to control a vehicle speed on the basis of the derived vehicle speed limit information,
    wherein the vehicle speed limit deriver derives the vehicle speed limit information, whether the navigation device malfunctions, and whether the TSR camera malfunctions.

16. The vehicle SCC system of claim 15, wherein critical operation information from the navigation device is determined after critical operation information from the TSR camera device is determined.

17. The vehicle SCC system of claim 15, when both the navigation device and TSR camera do not malfunction, selecting one of TSR camera information and navigation speed limit information based on a weight of a critical camera operation situation and a weight of a critical navigation signal receiving.

18. A method of controlling a vehicle smart cruise control (SCC) system on the basis of complex information, the method comprising:
    setting an SCC user-setting speed as a vehicle speed when an SCC function is turned on;
    driving a vehicle at the set vehicle speed;
    deriving vehicle speed limit information of a road section in which the vehicle is travelling from navigation speed limit information, road sign speed limit information, and surrounding vehicle speed information of the road section;
    controlling the vehicle speed on the basis of the derived vehicle speed limit information,
    wherein the road sign speed limit information is derived from a road sign recognition camera in the vehicle, and wherein the road sign speed limit information is derived in consideration of a critical operation situation of the road sign recognition camera and whether the road sign recognition camera malfunctions.

* * * * *